United States Patent [19]

Iwata

[11] Patent Number: 4,915,190

[45] Date of Patent: Apr. 10, 1990

[54] CONTROL SYSTEM FOR SPLIT AXLE DRIVE MECHANISM IN PART-TIME FOUR-WHEEL DRIVE VEHICLE

[75] Inventor: Hideyuki Iwata, Toyota, Japan

[73] Assignee: Toyota Jidosha Kabushiki Kaisha, Aichi, Japan

[21] Appl. No.: 296,600

[22] Filed: Jan. 13, 1989

[30] Foreign Application Priority Data

Jan. 13, 1988 [JP] Japan ................ 63-2866[U]

[51] Int. Cl.$^4$ ............................................. B60K 23/08
[52] U.S. Cl. .................................. 180/247; 74/665 T; 192/48.7
[58] Field of Search ............... 180/247, 248, 252, 233; 192/48.7, 88 V; 74/665 R, 665 T, 713

[56] References Cited

U.S. PATENT DOCUMENTS 4,625,584 12/1986 Onodera ............................ 180/247
4,779,698 10/1988 Iwata ................................ 180/247

FOREIGN PATENT DOCUMENTS 15019 1/1982 Japan .
135322 9/1983 Japan .
109431 6/1984 Japan .
110128 7/1988 Japan .

*Primary Examiner*—Charles A. Marmor
*Assistant Examiner*—Denn McGiehan
*Attorney, Agent, or Firm*—Oliff & Berridge

[57] ABSTRACT

In a part-time four-wheel drive vehicle equipped with a transfer device adapted to change the operating mode of the vehicle drive system from a two-wheel drive mode to a four-wheel drive mode in response to engagement of a hydraulically operated clutch mechanism provided therein and with a split axle drive mechanism in the form of a differential which includes a clutch mechanism disengageable for disconnecting a pair of side shafts of the differential from a set of non-driven split axle parts when the two-wheel drive mode is selected at the transfer device and engageable for connecting the side shafts to the non-driven split axle parts when the four-wheel drive mode is selected at the transfer device, a control system for the split axle drive mechanism includes a pressure switch arranged to detect a hydraulic pressure applied to the clutch mechanism of the transfer device to be operated when applied with a predetermined hydraulic pressure after engagement of the clutch mechanism of the transfer device and an actuator arranged to effect engagement of the clutch mechanism of the differential in response to operation of the pressure switch and to disengage the clutch mechanism of the differential when the pressure switch is rendered inoperative.

5 Claims, 5 Drawing Sheets

CONTROL SYSTEM FOR SPLIT AXLE DRIVE MECHANISM IN PART-TIME FOUR-WHEEL DRIVE VEHICLE

BACKGROUND OF THE INVENTION

1. Field of the Invention

The present invention relates to part-time four-wheel drive vehicles the operating mode of which is changeable between a two wheel drive mode and a four wheel drive mode, and more particularly to a part-time four-wheel drive vehicle equipped with a transfer device adapted to change the operating mode of the vehicle drive system from a two-wheel drive mode to a four-wheel drive mode in response to engagement of a hydraulically operated clutch mechanism provided therein and with a split axle drive mechanism in the form of a differential which includes a clutch mechanism disengageable for disconnecting a side shaft of the differential from a non-driven split axle part when the two-wheel drive mode is selected at the transfer device and engageable for connecting the side shaft to the non-driven split axle part when the four-wheel drive mode is selected at the transfer device.

2. Description of the Prior Art

Japanese Utility Model Early Publication No. 59-139424 discloses such a part-time four-wheel drive vehicle as described above wherein the clutch mechanism of the transfer device is arranged to be brought into engagement under control of a solenoid valve in response to operation of a changeover switch while the clutch mechanism of the differential is arranged to be brought into engagement with a predetermined time delay after operation of the changeover switch. In such control of the clutch mechanisms, the delay time for the latter clutch mechanism is determined irrespectively of a time for effecting engagement of the former clutch mechanism. In a cold season, however, the viscosity of fluid under pressure supplied to the former clutch mechanism increases due to fall of the ambient temperature, resulting in an increase of flow resistance of the fluid. This retards engagement of the former clutch mechanism. If the delay time for the latter clutch mechanism is short, the latter clutch mechanism will be brought into engagement prior to engagement of the former clutch mechanism. In such a case, smooth engagement of the latter clutch mechanism may not be effected. In the case that the delay time for the latter clutch mechanism is prolonged to avoid the foregoing problem, prompt engagement of the latter clutch mechanism may not be effected after engagement of the former clutch mechanism in a warm season.

SUMMARY OF THE INVENTION

It is, therefore, a primary object of the present invention to provide a control system for the split axle drive mechanism capable of effecting smooth engagement of the clutch mechanism of the differential without any undesired time delay after engagement of the clutch mechanism of the transfer device at all seasons.

According to the present invention, the primary object is attained by providing a control system for the split axle drive mechanism which comprise a pressure switch arranged to detect a hydraulic pressure applied to the clutch mechanism of the transfer device to be operated when applied with a predetermined hydraulic pressure after engagement of the clutch mechanism of the transfer device and means responsive to operation of the pressure switch for effecting engagement of the clutch mechanism of the differential and for disengaging the clutch mechanism of the differential when the pressure switch is rendered inoperative.

BRIEF DESCRIPTION OF THE DRAWINGS

Additional objects, features and advantages of the present invention will become readily apparent from the following detailed description of preferred embodiments thereof when taken together with the accompanying drawings, in which.

DESCRIPTION OF THE PREFERRED EMBODIMENTS

Figure 1:
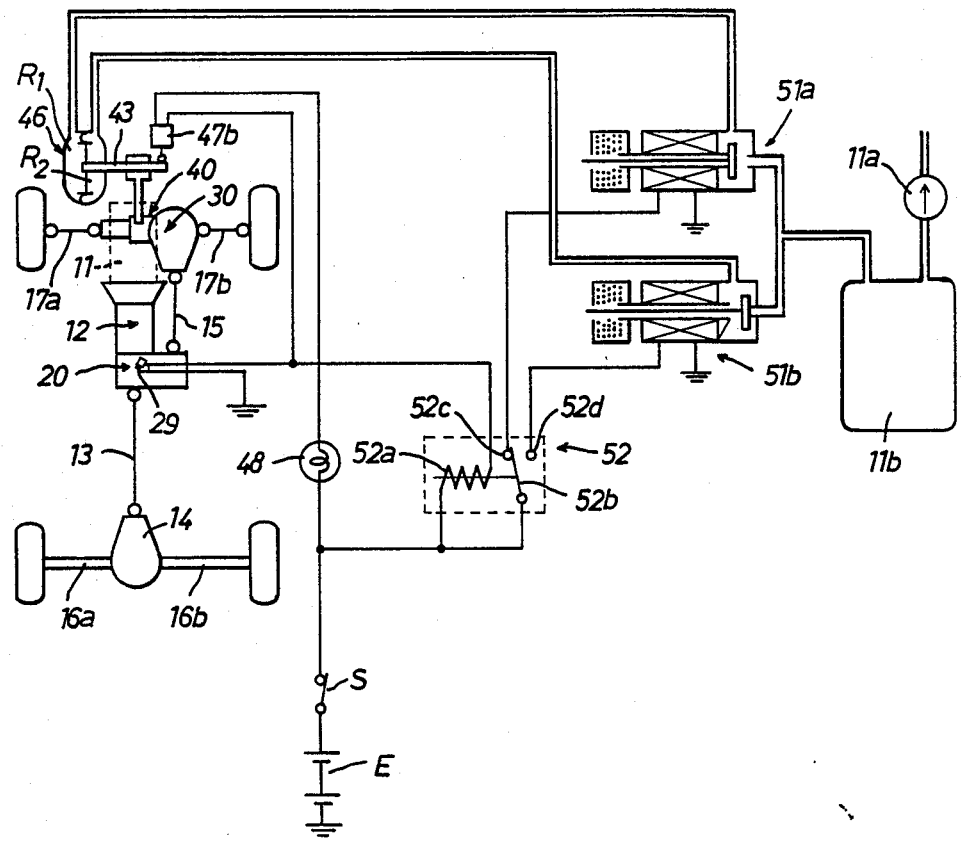
FIG. 1 is a schematic plan view of a control system for a split axle drive mechanism in a part-time four-wheel drive vehicle.
Figure 2:
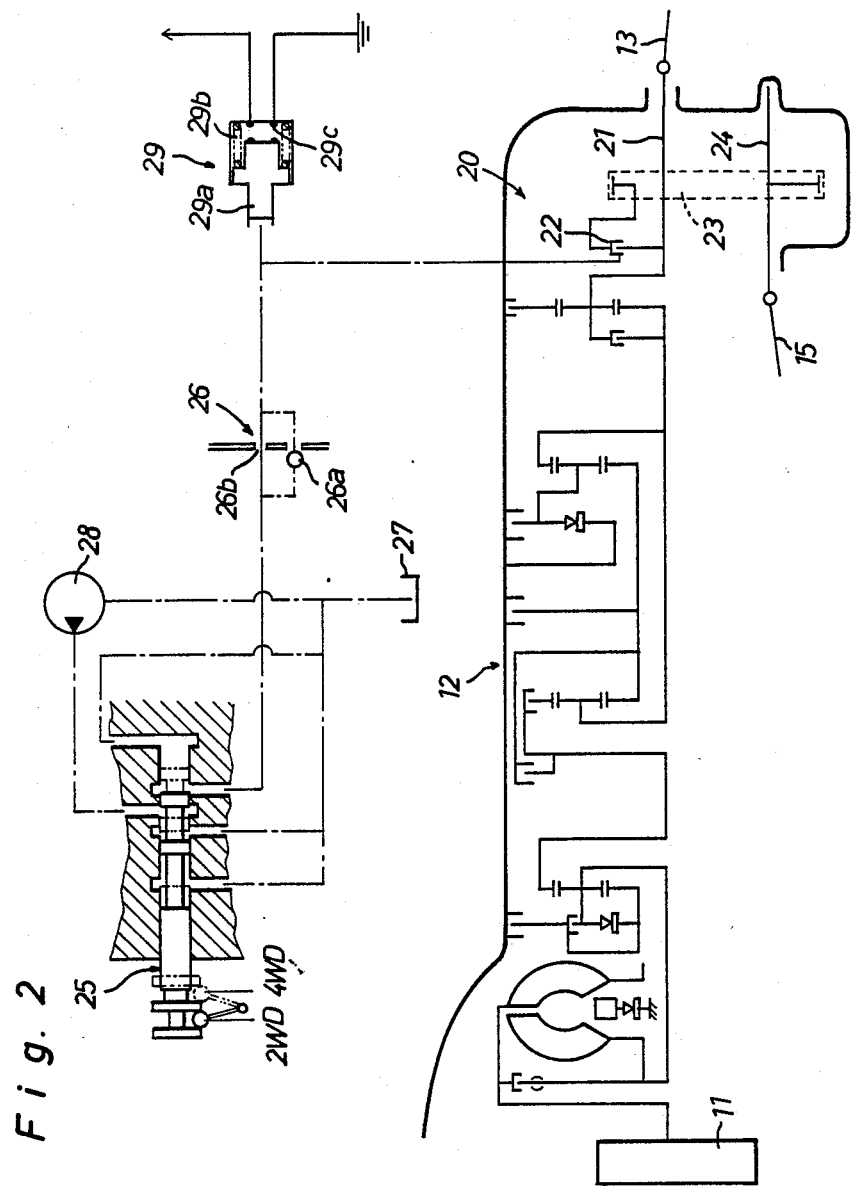
FIG. 2 is a schematic illustration of a transfer device in combination with a power transmission of the vehicle.

In FIG. 1 of the drawings, there is schematically illustrated a part-time four-wheel drive vehicle the operating mode of which is changeable between a two-wheel drive mode and a four-wheel drive mode. The vehicle comprises an internal combustion engine 11 mounted on the front portion of a vehicle body structure and a transfer device 20 attached to the rear end of engine 11 through an automatic power transmission 12. As schematically illustrated in FIG. 2, the transfer device 20 includes a first output shaft 21 drivingly connected to an output shaft of transmission 12 for rotation therewith, a hydraulically operated clutch mechanism 22 mounted on the first output shaft 21 to be engaged by fluid under pressure applied thereto from a hydraulic pump 28, and a second output shaft 24 arranged in parallel with the first output shaft 21 to be drivingly connected to the first output shaft 21 through a drive chain 23 in response to engagement of the clutch mechanism 22. The first output shaft 21 is drivingly connected at its outer end to a rear propeller shaft 13 to transfer the power from transmission 12 to a rear differential 14, while the second output shaft 24 is drivingly connected at its outer end to a front propeller shaft 15 to transfer the power from transmission 12 to a split axle drive mechanism in the form of a front differential 30. As shown in FIG. 1, the rear differential 14 is arranged to distribute the power from propeller shaft 13 to a pair of rear split axle parts 16a and 16b.

As shown in FIG. 2, the clutch mechanism 22 in transfer device 20 is arranged to be applied with the fluid under pressure from pump 28 under control of a manually operated 2-4 shift valve 25. When retained in a 2WD position, the shift valve 25 is conditioned to connect the clutch mechanism 22 to a fluid reservoir 27 through a check valve 26a and an orifice 26b of a flow control device 26 to maintain the clutch mechanism 22 in a disengaged position. When shifted to and retained in a 4WD position, the shift valve 25 is conditioned to connect the clutch mechanism 22 to the hydraulic pump 28 through the orifice 26b of flow control device 26 so as to effect engagement of the clutch mechanism 22. In this embodiment, the hydraulic pump 28 is driven by the vehicle engine 11 to apply a line pressure therefrom to the transmission 12 and clutch mechanism 22.

In the arrangement described above, a pressure switch 29 is connected to a fluid circuit between the clutch mechanism 22 and flow control device 26. The pressure switch 29 is in the form of a normally open switch which includes a piston 29a, a compression coil spring 29b and a pair of fixed contacts 29c. The piston 29a is retained in position under the load of coil spring 29b to open a connection between fixed contacts 29c. When applied with a predetermined switching pressure from the fluid circuit, the piston 29a is moved against the coil spring 29b to establish the connection between fixed contacts 29c. As shown in FIG. 1, one of the fixed contacts 29c is grounded, while the other fixed contact 29c is connected in series to a solenoid winding 52a of an electromagnetic relay 52.

Figure 3:
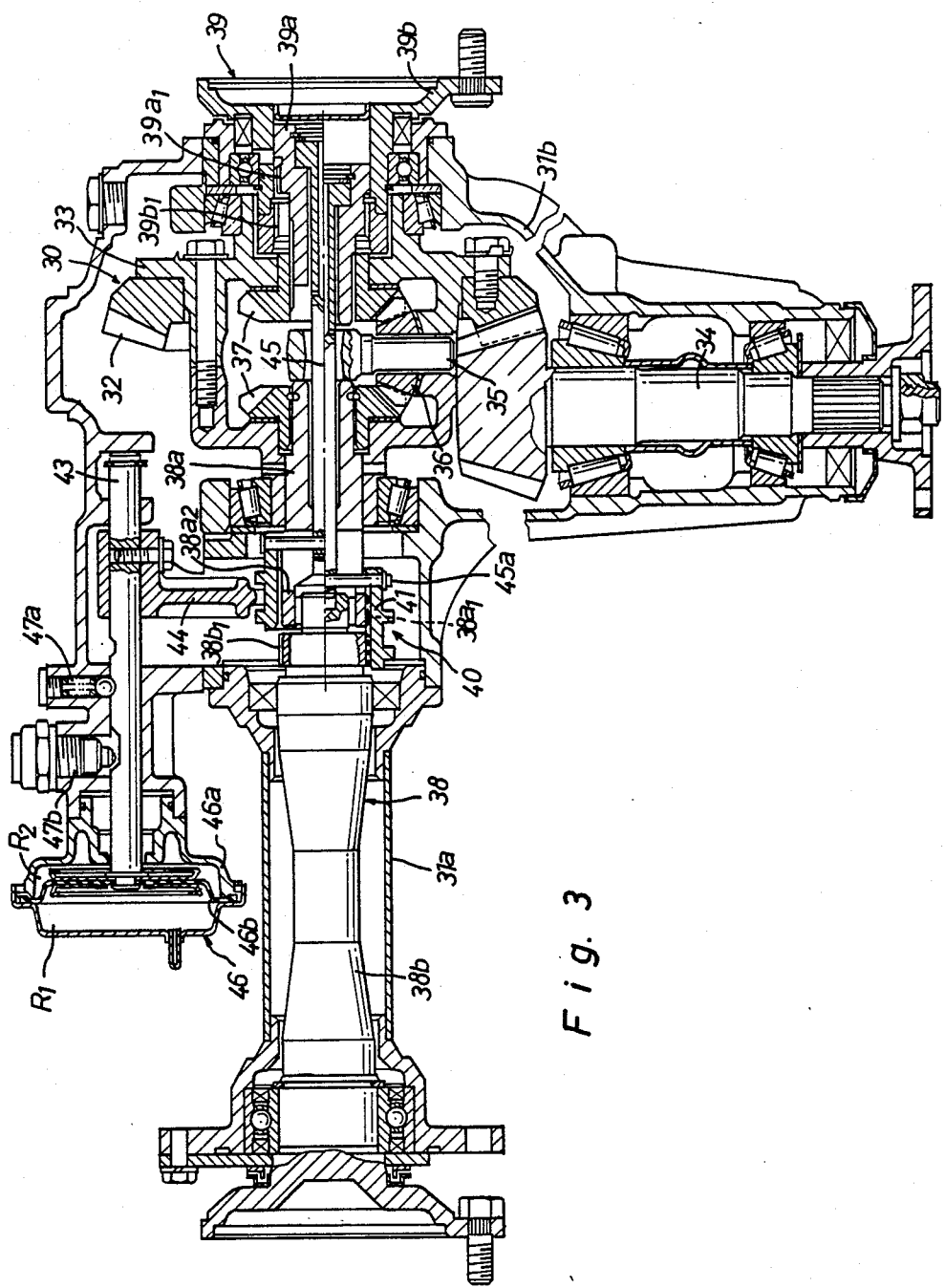
FIG. 3 is a sectioned plan view of the split axle drive mechanism shown in FIG. 1.

As shown in FIG. 3, the front differential 30 comprises a differential carrier housing 31b provided with a lateral extension tube 31a attached thereto, and an internal differential case 33 and a drive pinion shaft 34 rotatably mounted within the carrier housing 31b on orthogonally related axes. The drive pinion shaft 34 is drivingly connected to the front end of propeller shaft 15 and has a pinion 34a permanently meshed with a ring gear 32 attached to the differential case 33. The differential case 33 carries a pair of rotatable pinion gears 36 each mounted on a cross pin 35. The pinion gears 36 are in meshing engagement with a pair of side gears 37 which are rotatably mounted in the differential case 33 and connected respectively to split axle shaft assemblies 38 and 39. The left-hand axle shaft assembly 38 includes a side shaft 38a rotatably mounted within the differential case 33 and splined at its inner end to the left-hand side gear 37 for rotation therewith, while the right-hand split axle shaft assembly 39 includes a side shaft 39a arranged coaxially with the side shaft 38a and axially slidably splined at its inner end to the right-hand side gear 37 for rotation therewith.

The left-hand side shaft 38a is provided at its outer end portion with an integral spline wheel $38a_1$ and a radial slot $38a_2$. Arranged coaxially with the side shaft 38a is a first output member 38b in the form of an extension shaft which extends into the extension tube 31a through the carrier housing 31b in a liquid-tight manner. The extension shaft 38b has an inner end coupled with the outer end of side shaft 38a for relative rotation and an outer end portion rotatably carried on a ball bearing at the outer end of extension tube 31a. The extension shaft 38b is integrally provided at its inner end with a matching spline wheel $38b_1$ and at its outer end with an external flange for attachment with the left-hand front split axle part 17a. The right-hand side shaft 39a is rotatably coupled within a cylindrical portion of a second output member in the form of an external flange 38b which is rotatably mounted in the carrier housing 31b in a liquid-tight manner for attachment with the right-hand front split axle part 17b. The side shaft 39a is formed with an integral spline wheel $39a_1$, while the external flange 39b is integrally provided at its inner end with an internally splined sleeve $39b_1$ to be brought into meshing engagement with the spline wheel $39a_1$ of side shaft 39a.

To selectively establish drive connection between the front split axle parts 17a and 17b, the front differential 30 comprises a clutch mechanism 40 which includes an internally splined clutch sleeve 41 slidably mounted on the spline wheel $38a_1$ of side shaft 38a. The splined clutch sleeve 41 is shiftable between a disengaged position shown by an upper half in the figure and an engaged position where it couples the spline wheels 38a, and 38b, as shown by a lower half in the figure. The clutch mechanism 40 further includes a cross rod 45a extending across the radial hole $38a_2$ in side shaft 38a and fixed at its opposite ends to the splined clutch sleeve 41, and a connecting rod 45 axially slidably disposed in the side shafts 38a and 39a. The connecting rod 45 has an inner end connected to the cross rod 45a and an outer end fixedly coupled with the right-hand side side shaft 39a.

The clutch mechanism 40 is associated with a shift mechanism which includes a shift fork 44 mounted on a slide rod 43 at its base and engaged with an external groove of the splined clutch sleeve 41 at its yoke. The slide rod 43 is axially slidably mounted within one side portion of carrier housing 31b and arranged in parallel with the split axle shaft assembly 38. The slide rod 43 is connected at its outer end with a pneumatic actuator 46 to be translated and is selectively retained by a detent mechanism 47a to position the shift fork 44 in a shifted position. In the occurrence of unexpected damage of a vacuum supply system for the pneumatic actuator 46, the detent mechanism 47a acts as a fail-safe mechanism to retain the slide rodd 43 in its shifted position. A switch assembly 47b is attached to the carrier housing 31b to detect the shifting operation of slide rod 43 so as to indicate the disengaged or engaged position of the clutch mechanism 40. As shown in FIG. 1, the switch assembly 47b is connected to the pressure switch 29 and connected in series to an indication lamp 48 which is connected to a vehicle battery E through an ignition switch S.

The pneumatic actuator 46 is in the form of a vacuum motor of the diaphragm type which includes a housing assembly 46a fixedly coupled in an air-tight manner with the carrier housing 31b to contain therein the outer end of slide rod 43 and a diaphragm piston assembly 46b secured at its outer periphery with the housing assembly 46a to internally subdivide the housing assembly 46a into a pair of pressure chambers $R_1$ and $R_2$ and being connected to the outer end of slide rod 43. As shown in FIG. 1, the pressure chambers $R_1$, $R_2$ are connected to a pair of electrically operated changeover valves 51a and 51b which are arranged to be selectively activated under control of the electromagnetic relay 52 as will be described in detail later. The changeover valves 51a and 51b are connected to a vacuum tank 11b which is connected to an intake manifold of engine 11 through a check valve 11a.

The electromagnetic relay 52 includes a movable contact 52b connected to the vehicle battery E through ignition switch S, a first fixed contact 52c connected to the changeover valve 51a and a second fixed contact 52d connected to the changeover valve 51b. Assuming that the pressure switch 29 has been closed to energize the solenoid winding 52a of relay 52, the movable contact 52b is engaged with the first fixed contact 52c to activate the changeover valve 51a and disengaged from the second fixed contact 52d to deactivate the changeover valve 51b. In such a condition, the changeover valve 51a acts to connect the pressure chamber $R_1$ of vacuum actuator 46 to the vacuum tank 11b, while the changeover valve 51b acts to connect the pressure chamber $R_2$ to the atmospheric air. When the pressure switch 29 is opened to deenergize the solenoid winding 52a of relay 52, the movable contact 52b is disengaged from the first fixed contact 52c to deactivate the changeover valve 51a and engaged with the second fixed contact 52d to activate the changeover valve 51b. In such a condition, the changeover valve 51a acts to connect the pressure chamber $R_1$ of vacuum actuator 46 to the atmospheric air, while the changeover valve 51b acts to connect the pressure chamber $R_2$ to the vacuum tank 11b.

Figure 4:
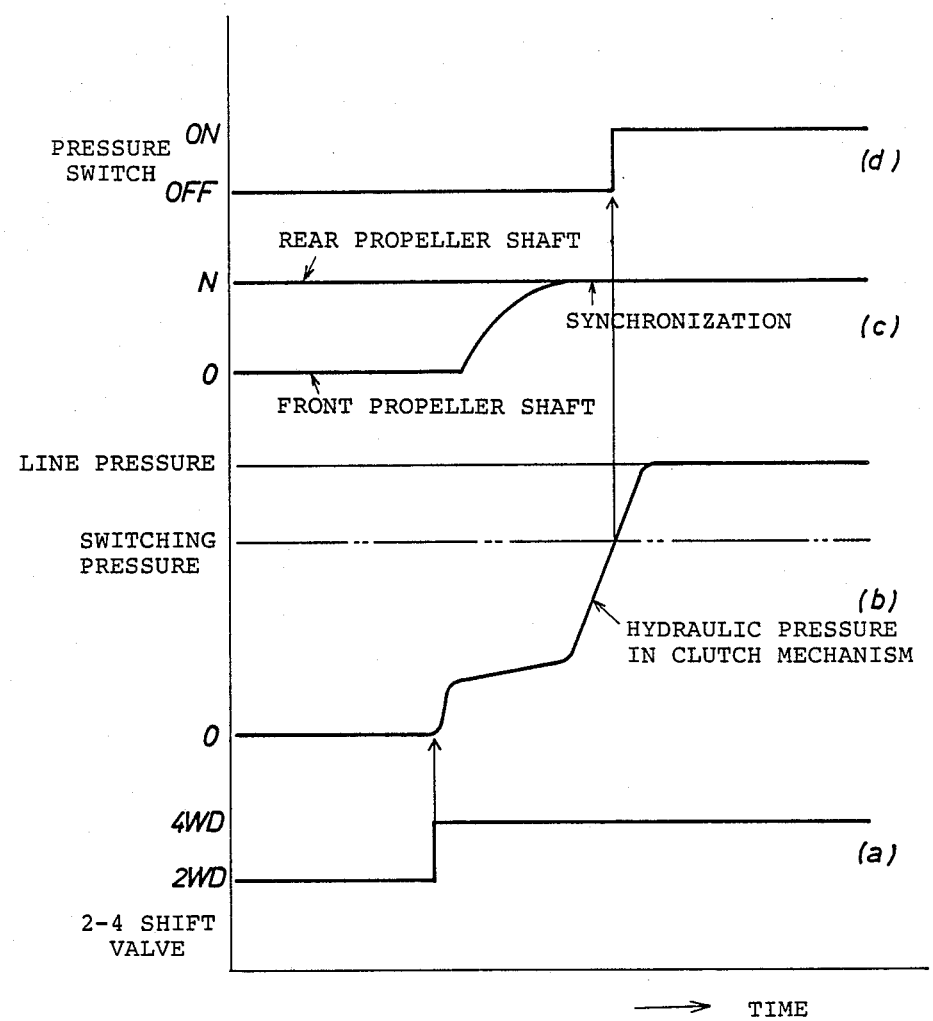
FIG. 4 is a graph illustrating the mode of operation of the transfer device.

Hereinafter, the operation of the transfer device 20 and front differential 30 during travel of the vehicle will be described with reference to the graph of FIG. 4. When it is desired to select a four-wheel drive mode at the transfer device 20, the 2–4 shift valve 25 is shifted by the driver from the 2WD position to the 4WD position as shown in FIG. 4 (a) to disconnect the clutch mechanism 22 from the fluid reservoir 27 and connect it to the hydraulic pump 28. Thus, the clutch mechanism 22 is brought into engagement by the fluid under pressure supplied thereto from pump 28 through the orifice 26b of flow control device 26 to establish drive connection between the output shafts 21 and 24. In this instance, the hydraulic pressure applied to the clutch mechanism 22 will increase as shown in FIG. 4 (b), and in turn, the rotation of front propeller shaft 15 will increase as shown in FIG. 4 (c) to synchronize with the rotation of rear propeller shaft 13. After the front propeller shaft 15 is synchronized in rotation to the rear propeller shaft 13, the hydraulic pressure will reach the predetermined switching pressure to complete engagement of clutch mechanism 22 and to close the pressure switch 29.

When the pressure switch 29 is closed after engagement of the clutch mechanism 22, the solenoid winding 52a of relay 52 is energized to engage the movable contact 52b with the fixed contact 52c and maintain it in engagement with the same. This activates the changeover valve 51a and deactivates the changeover valve 51b. Thus, the changeover valve 51a acts to connect the pressure chamber $R_1$ of vacuum actuator 46 to the vacuum tank 11b, while the changeover valve 51b acts to connect the pressure chamber $R_2$ of actuator 46 to the atmospheric air. As a result, the vacuum actuator 46 is operated to shift the slide rod 43 leftwards in FIG. 3, and the detent mechanism 47a acts to permit leftward movement of the slide rod 43. The shift fork 44 is, then, moved by the slide rod 43 leftwards to bring the clutch sleeve 41 into engagement with the spline wheel 38$b_1$ of extension shaft 38b, and in turn, the connecting rod 45 is moved leftwards by the clutch sleeve 41 to bring the spline wheel 39$a_1$ of side rod 39 into engagement with the internally splined sleeve 39$b_1$. This establishes drive connections between the side shafts 38a and extension shaft 38b and between the side shaft 39a and external flange 39b. Thus, the front differential 30 operates to transmit the power from front propeller shaft 15 to the front split axle parts 17a and 17b for the four wheel drive.

From the foregoing description, it will be understood that in shifting operation of the 2–4 shift valve to the 4WD position, the pressure switch 29 is closed with a slight time delay after engagement of the clutch mechanism 22 at the transfer device 20, and in turn, the vacuum actuator 46 is operated under control of the changeover valves 51a, 51b to effect engagement of the clutch mechanism 40 at the front differential 30. Such control of the vacuum actuator 46 is effective to cause engagement of the clutch mechanism 40 without any unexpected time delay after engagement of the clutch mechanism 22 at the transfer device 20.

When it is desired to select a two-wheel drive mode at the transfer device 20, the 2–4 shift valve 25 is shifted by the driver from the 4WD position to the 2WD position to disconnect the clutch mechanism 22 from the hydraulic pump 28 and connect it to the fluid reservoir 27. Thus, the fluid under pressure is discharged from the clutch mechanism 22 into the fluid reservoir 27 through the check valve 26a and orifice 26b of flow control device 26, and in turn, the clutch mechanism 22 is disengaged to disconnect the drive from the front propeller shaft 15. Simultaneously, the pressure switch 29 is opened to deenergize the solenoid winding 52a of relay 52, and in turn, the movable contact 52b is disengaged from the fixed contact 52c and engaged with the fixed contact 52d. As a result, the changeover valve 51a is deactivated to connect the pressure chamber $R_1$ of vacuum actuator 46 to the atmospheric air, while the changeover valve 51b is activated to connect the pressure chamber $R_2$ of vacuum actuator 46 to the vacuum tank 11b. Thus, the vacuum actuator 46 is opposed to shift the slide rod 43 rightwards and the detent mechanism 47a acts to permit rightward movement of the slide rod 43. The shift fork 44 is, then, moved by the slide rod 43 rightwards to disengage the clutch sleeve 41 from the spline wheel 38$b_1$, and in turn, the connecting rod 45 is moved rightwards to disengage the spline wheel 39$a_1$ of side shaft 39a from the spline wheel 39$b_1$. As a result, the side shaft 38a is disconnected from the extension shaft 38b, while the side shaft 39a is disconnected from the external flange 39b. In such a condition, the non-driven front road wheels back drive only the extension shaft 38b and external flange 39b but do not back drive the side shafts 38a, 39a, components of the front differential 30, the front propeller shaft 15, and components connected to the second output shaft 24 in the transfer device 20.

Figure 5:
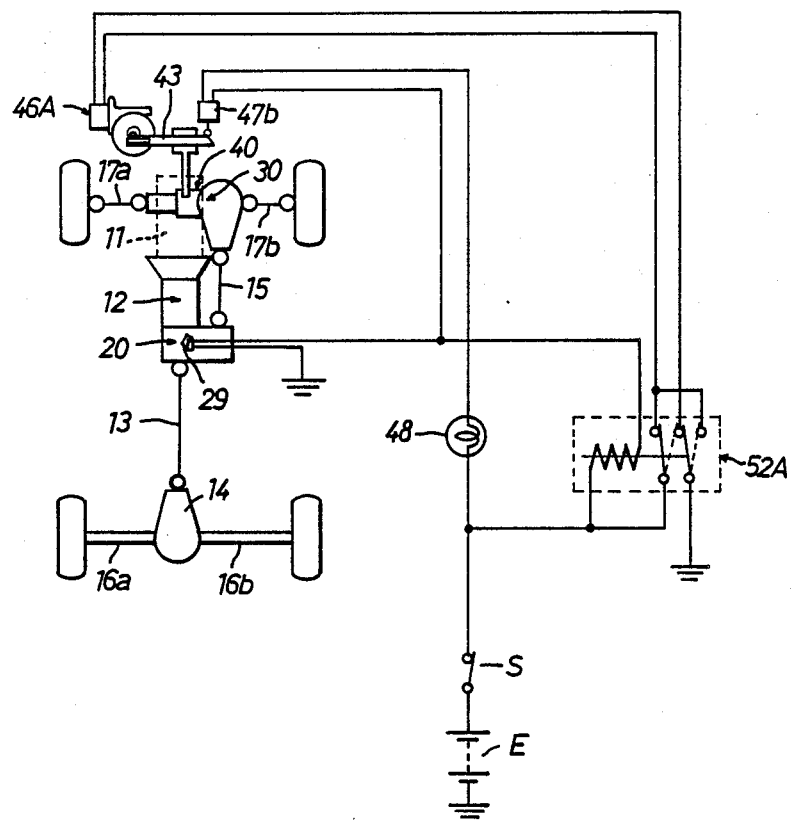
FIG. 5 is a schematic plan view illustrating a modification of the control system shown in FIG. 1.

Although the above embodiment has been adapted to a part-time four-wheel drive vehicle of the front-engine rear-wheel drive type, it may be adapted to a part-time four-wheel drive vehicle of the front-engine front-wheel drive type. In addition, the vacuum actuator 46 may be replaced with a reversible electric motor 46A as shown in FIG. 5. In such a modification, a well-known rack-and-pinion mechanism is adapted to translate the slide rod 43 in response to forward or reverse rotation of the electric motor 46A, and the changeover valves 51a, 51b and their associated parts can be eliminated to provide the control system of the front differential 30 in a simple construction.

Having now fully set forth structure and operation of a preferred embodiment of the concept underlying the present invention, various other embodiments as well as certain modifications and variations of the embodiment shown and described herein will obviously occur to those skilled in the art becoming familiar with the underlying concept. It is to be understood, therefore, that within the scope of the appended claims, the invention may be practiced otherwise than as specifically set forth herein.

What is claimed is:

1. In a part-time four-wheel drive vehicle equipped with a transfer device adapted to change the operating mode of the vehicle drive system from a two-wheel drive mode to a four-wheel drive mode in response to engagement of a hydraulically operated clutch mechanism provided therein and with a split axle drive mechanism in the form of a differential, which includes a clutch mechanism disengageable for disconnecting a side shaft of the differential from a non-driven split axle part when the two-wheel drive mode is selected at the transfer device and engageable for connecting the side shaft to the non-driven split axle part when the four-wheel drive mode is selected at the transfer device, a control system for the split axle drive mechanism comprising:
  a pressure switch arranged to detect a hydraulic pressure applied to the clutch mechanism of said transfer device to be operated when applied with a predetermined hydraulic pressure after engagement of the clutch mechanism of said transfer device; and
  means responsive to operation of said pressure switch for effecting engagement of the clutch mechanism of said differential and for disengaging the clutch mechanism of said differential when said pressure switch is rendered inoperative.

2. A control system for the split axle drive mechanism as claimed in claim 1, wherein said pressure switch is in the form of a normally open switch arranged to be closed when applied with the predetermined hydraulic pressure, and wherein said means responsive to operation of said pressure switch includes an electromagnetic relay arranged to be energized in response to closing of said pressure switch and an actuator effecting to effect engagement of the clutch mechanism of said differential in response to energization of said relay and to disengage the clutch mechanism of said differential in response to deenergization of said relay.

3. A control system for the split axle drive mechanism as claimed in claim 2, wherein said actuator is a pneumatic actuator arranged to be activated under control of electrically operated changeover valve means in response to energization of said relay.

4. A control system for the split axle drive mechanism as claimed in claim 2, wherein said actuator is an electric motor arranged to be activated in response to energization of said relay.

5. In a part-time four-wheel drive vehicle equipped with a transfer device adapted to change the operating mode of the vehicle drive system from a two-wheel drive mode to a four-wheel drive mode in response to engagement of a hydraulically operated clutch mechanism provided therein and with a split axle drive mechanism in the form of a differential which includes a clutch mechanism disengageable for disconnecting a pair of side shafts of the differential from a set of non-driven split axle parts when the two-wheel drive mode is selected at the transfer device and engageable for connecting the side shafts to the non-driven split axle parts when the four-wheel drive mode is selected at the transfer device, a control system for the split axle drive mechanism comprising:
  a normally open pressure switch arranged to detect a hydraulic pressure applied to the clutch mechanism of said transfer device to be closed when applied with a predetermined hydraulic pressure after engagement of the clutch mechanism of said transfer device; and
  means for effecting engagement of the clutch mechanism of said differential in response to closing of said pressure switch and for disengaging the clutch mechanism of said differential when said pressure switch is opened.

* * * * *